US010915421B1

(12) United States Patent
Chauhan et al.

(10) Patent No.: US 10,915,421 B1
(45) Date of Patent: Feb. 9, 2021

(54) TECHNOLOGY FOR DYNAMICALLY TUNING PROCESSOR FEATURES

(71) Applicant: Intel Corporation, Santa Clara, CA (US)

(72) Inventors: Adarsh Chauhan, Bangalore (IN); Jayesh Gaur, Bangalore (IN); Franck Sala, Haifa (IL); Lihu Rappoport, Haifa (IL); Zeev Sperber, Zichron Yackov (IL); Adi Yoaz, Hof HaCarmel (IL); Sreenivas Subramoney, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/575,535

(22) Filed: Sep. 19, 2019

(51) Int. Cl.
*G06F 11/34* (2006.01)
*G06F 15/78* (2006.01)
(Continued)

(52) U.S. Cl.
CPC ............ *G06F 11/3476* (2013.01); *G06F 9/24* (2013.01); *G06F 9/3836* (2013.01);
(Continued)

(58) Field of Classification Search
CPC ............ G06F 11/3024; G06F 11/3476; G06F 15/7875
See application file for complete search history.

(56) References Cited

U.S. PATENT DOCUMENTS

| 2011/0154003 | A1* | 6/2011 | Carrizo | G06F 11/3452 |
| | | | | 713/1 |
| 2014/0181487 | A1* | 6/2014 | Sasanka | G06F 15/781 |
| | | | | 713/1 |
| 2016/0253264 | A1 | 9/2016 | Bose et al. | |
| 2017/0090955 | A1* | 3/2017 | Hsiao | G06F 11/3476 |
| 2017/0161089 | A1* | 6/2017 | Frazier | G06F 9/44505 |
| 2019/0354308 | A1* | 11/2019 | Li | G06F 11/3034 |

FOREIGN PATENT DOCUMENTS

| EP | 1 783 603 A2 | 5/2007 |
| WO | WO 2016/097794 | 6/2016 |

OTHER PUBLICATIONS

Qureshi, et al., "Set-Dueling-Controlled Adaptive Insertion for High-Performance Caching", IEEE Micro, Jan. 2008, pp. 91-98, vol. 28, No. 1.

(Continued)

*Primary Examiner* — Zachary K Huson
(74) *Attorney, Agent, or Firm* — Trop, Pruner & Hu, P.C.

(57) ABSTRACT

A processor comprises a microarchitectural feature and dynamic tuning unit (DTU) circuitry. The processor executes a program for first and second execution windows with the microarchitectural feature disabled and enabled, respectively. The DTU circuitry automatically determines whether the processor achieved worse performance in the second execution window. In response to determining that the processor achieved worse performance in the second execution window, the DTU circuitry updates a usefulness state for a selected address of the program to denote worse performance. In response to multiple consecutive determinations that the processor achieved worse performance with the microarchitectural feature enabled, the DTU circuitry
(Continued)

automatically updates the usefulness state to denote a confirmed bad state. In response to the usefulness state denoting the confirmed bad state, the DTU circuitry automatically disables the microarchitectural feature for the selected address for execution windows after the second execution window. Other embodiments are described and claimed.

20 Claims, 9 Drawing Sheets

(51) Int. Cl.
 *G06F 11/30* (2006.01)
 *G06F 9/38* (2018.01)
 *G06F 9/24* (2006.01)
(52) U.S. Cl.
 CPC ...... *G06F 11/3024* (2013.01); *G06F 11/3055* (2013.01); *G06F 15/7875* (2013.01)

(56) References Cited

OTHER PUBLICATIONS

Lee, et al., "Throttling-Based Resource Management in High Performance Multithreaded Architectures", IEEE Transactions on Computers, Sep. 2006, 12 pages, vol. 55, No. 9.
Iyer, et al.; "Microarchitecture-Level Power Management", IEEE Transactions on Very Large Scale Integration (VLSI) Systems, Jun. 2002, 10 pages, vol. 10, No. 3.
Wang, et al, "Compiler-Based Adaptive Fetch Throttling for Energy-Efficiency"; 2006, 9 pages, IEEE International Symposium on Performance Analysis of Systems and Software.
U.S. Appl. No. 16/021,838, filed Jun. 28, 2018, entitled, "Automatic Predication of Hard-to-Predict Convergent Branches," by Adarsh Chauhan, et al.
European Patent Office, European Search Report dated Nov. 26, 2020 in European patent application No. 20175698.8, 8 pages total.

* cited by examiner

Execution Stream

Begin
   Previous-Cycles-Counter = Current-Cycles-Counter
   Current-Cycles-Counter = 0
   Retired-Instructions-Counter = 0
   For i = 1 to Selected-Address-Count
     Involvement-Counter(i) = 0
   End-For
   {Once the window starts, increment the Current-Cycles-Counter each cycle, increment the Retired-Instructions-Counter when an instruction retires, and increment the relevant Involvement-Counter when appropriate.}

——————————— Start Window

| $Cycle_1$ |  | ++ CCC |  |  |  |
| --- | --- | --- | --- | --- | --- |
| $Cycle_2$ | Retire $SA_1$ | ++ CCC | ++ RIC | ++ RC | ++ $IC_1$ |
| $Cycle_3$ | Retire UA | ++ CCC | ++ RIC | ++ RC |  |
| $Cycle_4$ |  | ++ CCC |  |  |  |
| $Cycle_5$ | Retire $SA_1$ | ++ CCC | ++ RIC | ++ RC | ++ $IC_1$ |
| $Cycle_6$ | Retire $SA_2$ | ++ CCC | ++ RIC | ++ RC | ++ $IC_2$ |
| $Cycle_7$ |  | ++ CCC |  |  |  |
| $Cycle_8$ | Retire $SA_1$ | ++ CCC | ++ RIC | ++ RC | ++ $IC_1$ |
| ... | | | | | |
| $Cycle_Q$ | Retire $SA_2$ | ++ CCC | ++ RIC | ++ RC | ++ $IC_2$ |

——————————— End Window

{End the window when the Retired-Instruction-Counter == Window-Size.}
If Global-Enable-Flag == 1
   Cycle-Difference = Current-Cycles-Counter - Previous-Cycles-Counter
   If Cycle-Difference > Significance-Threshold
     For i = 1 to Selected-Address-Count
       If (IC(i) >= Involvement-Threshold) & (1 < Usefulness-Status(i) < 5)
         If Current-Cycles-Counter < Previous-Cycles-Counter
           Increment Usefulness-State(i)
         If Current-Cycles-Counter > Previous-Cycles-Counter
           Decrement Usefulness-State(i)
     End-For
   Global-Enable-Flag = 0
Else
   Global-Enable-Flag = 1
Return to Begin

Key

CCC: Current-Cycles-Counter
IC: Involvement-Counter
RC: Refresh-Counter
RIC: Retired-Instruction-Counter SA: Selected-Address
UA: Unselected-Address

FIG. 4

TECHNOLOGY FOR DYNAMICALLY TUNING PROCESSOR FEATURES

TECHNICAL FIELD

The present disclosure pertains in general to data processing systems and in particular to technology for dynamically tuning processors in data processing systems.

BACKGROUND

A central processing unit (CPU) in a data processing system may include various different features that, in some circumstances, improve the performance of the CPU, relative to a CPU without those features. For instance, in some circumstances, a CPU with features for speculative execution may perform better than a comparable CPU without features for speculative execution.

A feature of a CPU may also be tunable or configurable, in that the feature supports more than one setting. For purposes of this disclosure, a configurable feature of a CPU may be referred to as a "microarchitectural feature." For instance, the CPU may be able to enable and disable a microarchitectural feature. In addition or alternatively, the CPU may be able to apply different settings to a microarchitectural feature when that microarchitectural feature is enabled. In other words, the microarchitectural feature may support a range of settings.

However, a microarchitectural feature that is enabled (i.e., turned on) may cause performance improvement for one part of an application, while causing performance degradation for another part of the application. Additionally, whether a microarchitectural feature causes performance improvement or performance degradation for an application (or for part of an application) may depend on other circumstances associated with execution of that application (or that part of the application).

For instance, a microarchitectural feature may cause an application to achieve better performance with some types and/or amounts of data, but worse performance with other types and/or amounts of data. Also, a data processing system may execute multiple applications concurrently, and performance of one application may vary, depending on the types and numbers of other applications that are also executing on the data processing system, as well as the types and/or amounts of data being processed by the other applications. Moreover, a modern processor may have many different microarchitectural features, and those features may have complex interactions which cause differences in performance in different circumstances.

For at least the foregoing reasons, it is challenging to tune microarchitectural features in a way that realizes improved performance in a wide variety of different circumstances.

BRIEF DESCRIPTION OF THE DRAWINGS

Features and advantages of the present invention will become apparent from the appended claims, the following detailed description of one or more example embodiments, and the corresponding figures, in which:

FIG. 4 is a pseudocode description of operations for dynamically tuning the processor of FIG. 1.

DETAILED DESCRIPTION

As indicated above, the present disclosure introduces technology for dynamically tuning processors in data processing systems. In particular, the present disclosure provides for the runtime evaluation of different settings for one or more microarchitectural features to determine a preferred setting for current conditions, and for dynamic application of that preferred setting. In addition, evaluations may be repeated over time, to determine and apply preferred settings for changed conditions.

As described in greater detail below, in one embodiment, a dynamic tuning unit in a processor causes the processor to execute software with a microarchitectural feature of the processor in a first setting (e.g., disabled) for a first window of execution, and with the microarchitectural feature in a second setting (e.g., enabled) for a second window of execution, where the windows are of the same size. The dynamic tuning unit then determines whether performance has improved or degraded, based on the number of cycles needed to complete each of those windows. For instance, if the second window was completed in significantly fewer cycles than the first, the dynamic tuning unit may determine that the second setting for the microarchitectural feature caused improved performance. Also, if the processor completed the second window in fewer cycles than the first, then the processor was able to execute more instructions per cycle (IPC), on average, for the second window. Accordingly, improved performance may be evaluated in terms of effective instructions per cycle (IPC), with performance improvements reflected in higher effective IPC.

The dynamic tuning unit may use such evaluations, together with a finite state machine, to determine a preferred setting for the microarchitectural feature. Furthermore, the dynamic tuning unit may evaluate different portions of the software being executed, and the dynamic tuning unit may determine and apply different preferred settings of the microarchitectural feature for those different portions of the software. For instance, the dynamic tuning unit may enable the microarchitectural feature for some portions of a workload and disable the microarchitectural feature for other portions of the workload. For purposes of this disclosure, the process of causing a microarchitectural feature of a processor to use different settings (e.g., enabled or disabled) for different parts of a workload may be referred to as "selective throttling" of that microarchitectural feature.

Figure 1:
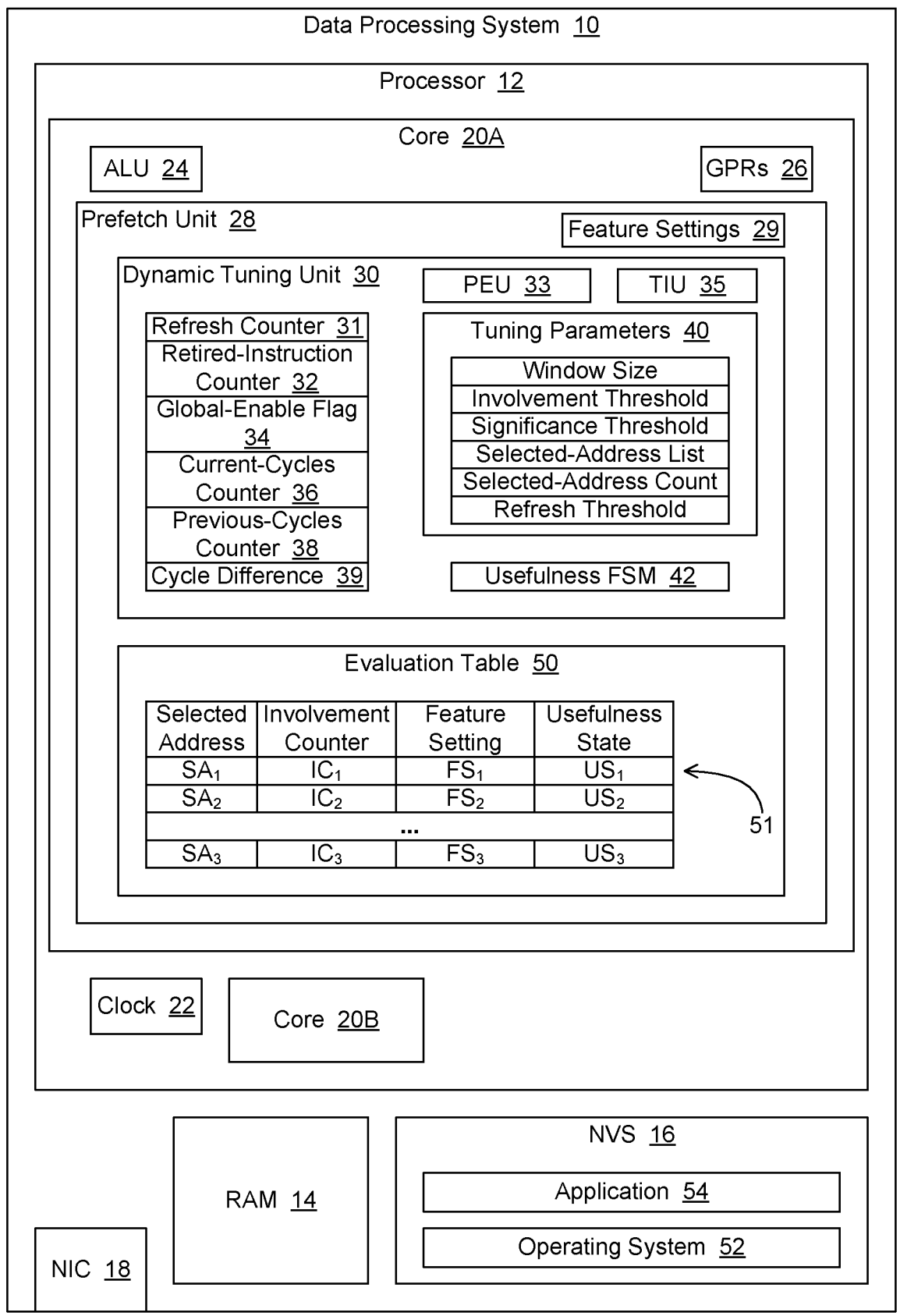
FIG. 1 is a block diagram depicting an example embodiment of a data processing system with technology for dynamically tuning the processor in the data processing system.

FIG. 1 is a block diagram depicting an example embodiment of a data processing system 10 with technology for dynamically tuning the processor 12 data processing system 10. Data processing system 10 is a hypothetical system, with various hypothetical components and features to illustrate the technology introduced herein.

As illustrated, in addition to the CPU or processor 12, data processing system 10 includes other hardware resources, such as random access memory (RAM) 14, non-volatile storage (NVS) 16, a network interface controller (NIC) 18, etc. Also, in the embodiment of FIG. 1, processor 12 includes two cores 20A-20B, as well as other modules, such as a clock 22, etc. As illustrated, core 20A includes various processing resources, such as an arithmetic logic unit (ALU) 24, a set of general purpose registers 26, a prefetch unit 28, etc. Core 20B may also include the same or similar type of components.

Also, in other embodiments, a processor may include fewer cores or more cores. For instance, a processor may include a single core, or tens or hundreds of cores. Also processor may be implemented as an integrated circuit or "chip" that is mounted to a substrate to form a package. Alternatively, a processor may be implemented as a package that contains more than one chip.

In the embodiment of FIG. 1, NVS 16 includes software such as an operating system (OS) 52 and an application 54. Data processing system 10 may copy the software into RAM 14 for execution. Also, data processing system 10 may execute software on multiple cores concurrently. In addition, each core may include multiple logical processors (LPs), and each core may execute software on multiple LPs concurrently. For instance, in a data processing system with a CPU containing four cores with two LPs per core, the data processing system may concurrently execute eight different applications, or eight instances of a single application, etc.

Also, in the embodiment of FIG. 1, prefetch unit 28 is tunable, in that the processor 12 can turn prefetch unit 28 on or off, and/or processor 12 can apply different settings to prefetch unit 28 when prefetch unit 28 is turned on. In other words, prefetch unit 28 is a microarchitectural feature. In particular, prefetch unit 28 includes feature settings 29 which can be updated to affect whether and/or how prefetch unit 28 operates.

Moreover, prefetch unit 28 includes a dynamic tuning unit 30 with control logic for dynamically tuning prefetch unit 28 (e.g., by dynamically adjusting feature settings 29), as described in greater detail below. In addition, a data processing system may include multiple microarchitectural features, as well as a distinct dynamic tuning unit for each of those microarchitectural features. For purposes of this disclosure, some or all of the control logic for a dynamic tuning unit may be referred to as "tuning control logic."

In the embodiment of FIG. 1, the control logic in dynamic tuning unit 30 includes a retired-instruction counter 32, a global-enable flag 34, a current-cycles counter 36, a previous-cycles counter 38, a refresh counter 31, and a usefulness finite state machine (FSM) 42, as described in greater detail below. The control logic also includes various tuning parameters 40 for adjusting how dynamic tuning unit 30 operates. In the embodiment of FIG. 1, tuning parameters 40 include parameters for a window size, an involvement threshold, a significance threshold, a selected-address list, a selected-address count, and a refresh threshold, as described in greater detail below. The control logic also includes a performance evaluation unit (PEU) 33 which determines whether enabling prefetch unit 28 causes better or worse performance, as well as a tuning implementation unit (TIU) 35 which implements tuning decisions by enabling or disabling the prefetch functionality of prefetch unit 28 for selected addresses after the usefulness states for those addresses have reached confirmed good or confirmed bad states, respectively, as described in greater detail below.

Prefetch unit 28 also includes an evaluation table 50, and dynamic tuning unit 30 uses evaluation table 50 to evaluate the performance of different feature settings for prefetch unit 28. In the embodiment of FIG. 1, evaluation table 50 includes a row or entry 51 for each selected address (SA) in application 54, and that row includes a, involvement counter (IC), a feature setting (FS), and a usefulness state (US) for that SA. In FIG. 1, subscripts are used to identify the variables or values which correspond to a given SA. Additional details for an example embodiment of a process for using evaluation table 50 are provided below. An SA may also be referred to as an instruction pointer (IP).

Thus, the control logic in dynamic tuning unit 30 includes various control structures (e.g., PEU 33, TIU 35, and usefulness FSM 42) and various data storage structures (e.g., refresh counter 31, retired-instruction counter 32, etc.). Those data storage structures may be implemented as one or more registers, as portions of one or more registers, or as any other suitable type or types of data storage structures. Similarly, the control structures may be implemented using any suitable type or types of hardware structures. For instance, as indicated below, some or all of the control logic for implementing some or all of the operations of dynamic tuning unit 30 may be implemented in hardware circuitry in a chip. Accordingly, a dynamic tuning unit (DTU) may also be referred to as a DTU circuit (or as DTU circuitry), a PEU may be referred to as a PEU circuit (or as PEU circuitry), a TIU may be referred to as a TIU circuit (or as TIU circuitry), etc. Also, terms like "logic" may be used to refer to hardware logic circuitry, to other type of hardware components, or to combinations of hardware components.

Figure 2:
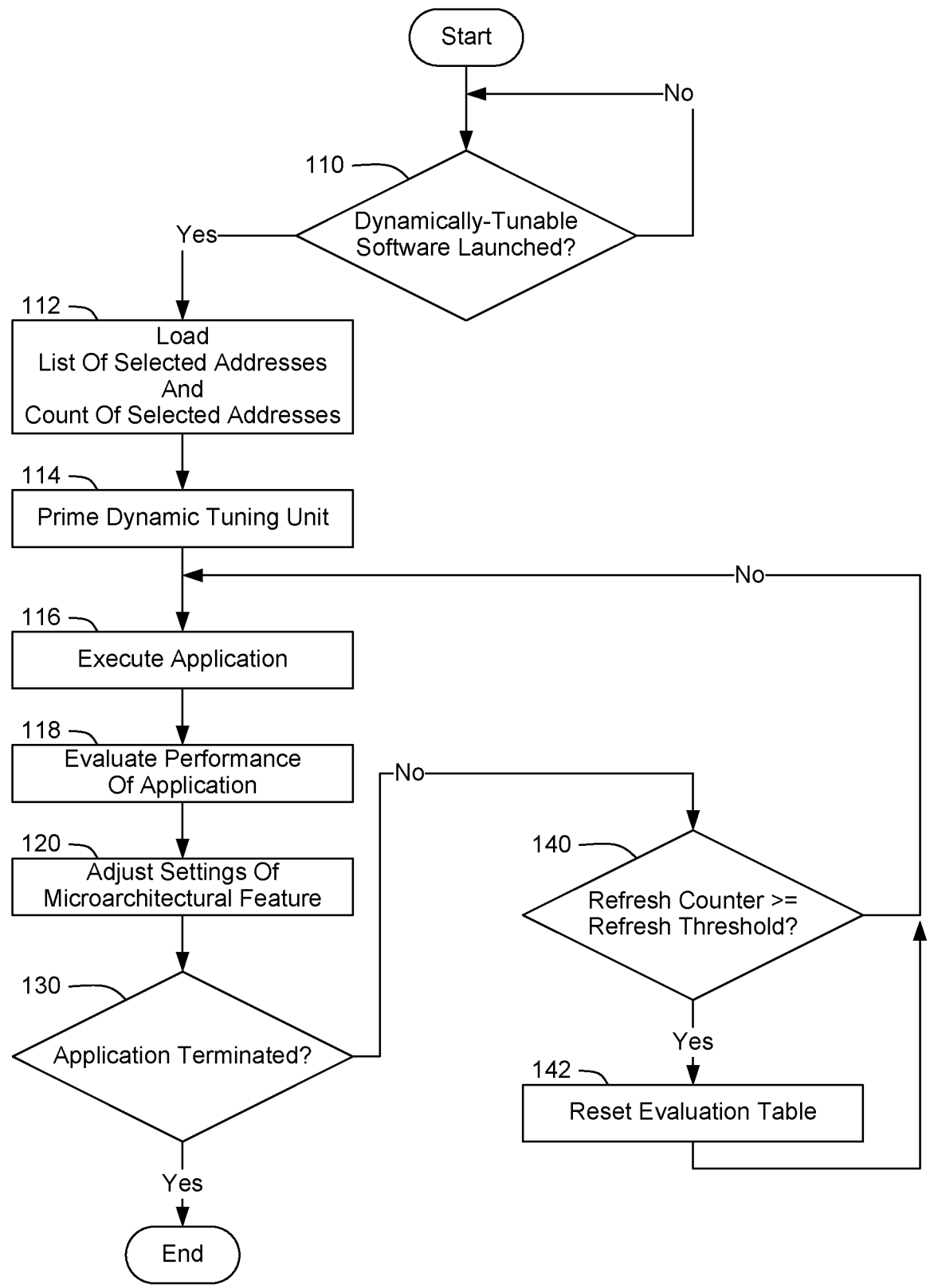
FIG. 2 is a flowchart of an example process for dynamically tuning the processor of FIG. 1.

FIG. 2 is a flowchart of an example process for dynamically tuning processor 12. In particular, the process of FIG. 2 illustrates how dynamic tuning unit 30 evaluates the performance of processor 12 with different settings for prefetch unit 28, and dynamically tunes prefetch unit 28 for improved performance. For purposes of illustration, that process is described in the context of dynamic tuning unit 30 evaluating and adjusting the performance of processor 12 while processor is executing application 54, to enable processor 12 to achieve better performance while executing application 54. Accordingly, application 54 may be referred to as a "dynamically-tunable software." However, dynamic tuning unit 30 may use the same kinds of operations to improve the performance of other dynamically-tunable software.

The process of FIG. 2 may start with dynamic tuning unit 30 determining whether dynamically-tunable software (such as application 54) has been started or launched, as shown at block 110. If such software has not been launched, dynamic tuning unit 30 may wait for dynamically-tunable software to be launched.

However, if application 54 has been launched, dynamic tuning unit 30 may load a list of addresses for instructions within application 54 into the "selected-address list" parameter in tuning parameters 40, as shown at block 112. In particular, that list of addresses identifies all of the instructions within application 54 that are to be evaluated for performance with different settings of prefetch unit 28. As described in greater detail below, dynamic tuning unit 30 will subsequently use the selected-address list evaluate different portions of application 54 and dynamically tune prefetch unit 28 for those different portions, based on that evaluation. Dynamic tuning unit 30 may also load a count of the SAs into the "selected-address count" parameter. In particular, in one embodiment, dynamic tuning unit 30 includes heuristic control logic which automatically analyzes application 54 and generates the selected-address list (and selected-address count), based on evaluations as to which instructions in application 54 are most likely to enable performance improvements due to selective throttling of prefetch unit 28. After or while generating the selected-address list and the selected-address count, dynamic tuning unit 30 may load those values into tuning parameters 40.

As shown at block 114, dynamic tuning unit 30 may then execute some initialization operations to prime itself. For instance, dynamic tuning unit 30 may create evaluation table 50 for application 54, including a row or entry for each SA in application 54, and initializing the usefulness state for each SA to an initial state of neutral. For purposes of this disclosure, the addresses of instructions which have not been selected may be referred to as "unselected addresses" (UAs). For instance, FIG. 4 illustrates operations triggered by retirement of SAs and operations triggered by retirement of UAs.

Referring again to FIG. 1, dynamic tuning unit 30 may subsequently use usefulness FSM 42 to adjust the state for each SA, as described in greater detail below.

Figure 3:
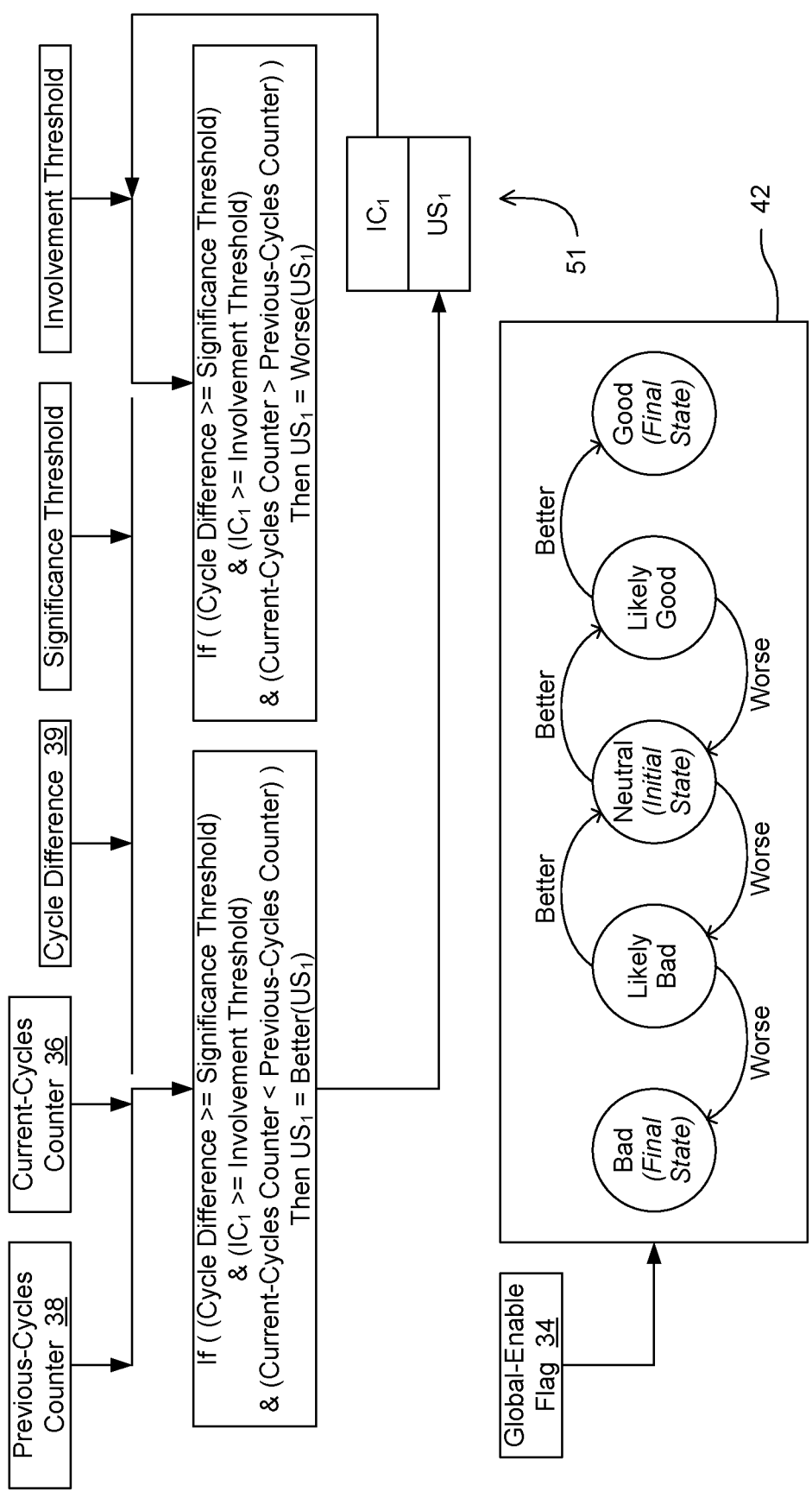
FIG. 3 is a block diagram depicting the behavior of the finite state machine in the processor of FIG. 1.

FIG. 3 is a block diagram depicting the behavior of usefulness FSM 42. As illustrated, that FSM includes three intermediate states and two final states. The intermediate states include the initial state of "neutral," as well as the states of "likely bad" and "likely good." The final states are "bad" and "good." As indicated by the upper set of arrows with the label "Better," usefulness FSM 42 changes the usefulness state of an SA from an intermediate state to the next state to the right, in response to a determination that a particular setting of prefetch unit 28 resulted in better performance than a default or previous setting. Likewise, as indicated by the lower set of arrows with the label "Worse," usefulness FSM 42 changes the usefulness state of an SA from an intermediate state to the next state to the left, in response to a determination that a particular setting of prefetch unit 28 resulted in worse performance than a default or previous setting. For purposes of this disclosure, usefulness states of "bad," "likely bad," "neutral," "likely good," and "good," may be indicated using the values 1-5, respectively. Also, the lack of arrows in certain positions in usefulness FSM 42 indicate that, once the state of an SA reaches a final state, the SA stays at that state (until it is reset), irrespective of subsequent performance results. However, in other embodiments, usefulness FSMs may include more than three intermediate states. Nevertheless, in order to reach a final state, an SA must have at least two consecutive changes in the same direction (i.e., at least two consecutive increments or decrements).

One important aspect of FSM 42 is that it provides for bimodality, in that it allows the usefulness state for an SA to move in two different directions. For instance, an SA may fluctuate back and forth between states such as "likely bad" and "likely good" for multiple different windows, so that brief conditions of improved or degraded performance (such as might occur when application 54 performs a program phase change) do not cause dynamic tuning unit 30 to lock in a particular setting for the microarchitectural feature. Instead, as indicated above, in order to reach a final state, an SA must have at least two consecutive changes in the same direction.

FIG. 3 also illustrates some of the variables that dynamic tuning unit 30 uses in connection with usefulness FSM 42 to dynamically evaluate and adjust the usefulness state for an example SA. In particular, FIG. 3 reflects an example process for evaluating and adjusting $US_1$ for $SA_1$, based at least in part in $IC_1$ (which variables are also illustrated in FIG. 1 in the first row 51 of evaluation table 50). In particular, FIG. 3 illustrates that dynamic tuning unit 30 evaluates performance in response to completion of a "current cycle" that was executed with global-enable flag 34 set. FIG. 3 also illustrates that dynamic tuning unit 30 uses usefulness FSM 42 to adjust an intermediate usefulness state of $SA_1$ to a "better" or "worse" usefulness state, in certain circumstances. In particular, any adjustment depends on (a) cycle difference 39 being greater than or equal to the significance threshold and (b) $IC_1$ being greater than or equal to the involvement threshold. If those preliminary conditions are met, and if current-cycles counter 36 is <u>lessthan</u> previous-cycles counter 38, then dynamic tuning unit 30 uses a "<u>better</u>" function of FSM 42 to change $US_1$ from an intermediate usefulness state to the next usefulness state to the right. Also, if those preliminary conditions are met, and if current-cycles counter 36 is <u>greaterthan</u> previous-cycles counter 38, then dynamic tuning unit 30 uses a "<u>worse</u>" function of FSM 42 to change $US_1$ from an intermediate usefulness state to the next usefulness state to the left. The process for evaluating and adjusting usefulness states is described more fully below.

Referring again to block 114 of FIG. 2, the operation for priming dynamic tuning unit 30 may also include the clearing of variables such as retired-instruction counter 32, global-enable flag 34, current-cycles counter 36, previous-cycles counter 38, and refresh counter 31. As described in greater detail below, dynamic tuning unit 30 uses retired-instruction counter 32 to count the number of instructions that have been retired within an execution window. A retired-instruction counter may also be referred to as a "window-length counter."

Also, dynamic tuning unit 30 uses global-enable flag 34 to indicate whether or not prefetch unit 28 was enabled for that execution window. A global-enable flag may also be referred to as a "global qualified bit."

Also, dynamic tuning unit 30 uses current-cycles counter 36 to count the number of cycles that have transpired so far in the current window. And before starting a new window, dynamic tuning unit 30 may copy the value from current-cycles counter 36 to previous-cycles counter 38, so that the total number of cycles for the new window can subsequently be compare to the total number of cycles for the previous window. A current-cycles counter may also be referred to as a "current-window clock."

Also, dynamic tuning unit 30 uses refresh counter 31 to count the number of cycles across multiple windows. As described in greater detail below, when refresh counter 31 reaches the predetermined refresh threshold, dynamic tuning unit 30 may perform a global refresh, to unlock any SAs that have reached a final state, which enables dynamic tuning unit 30 to assign a different state to those SAs in response to changed conditions.

Priming operations may also include the setting of some of all tuning parameters 40 with desired values (including, for instance, values for the window size, for the involvement threshold, for the significance threshold, and for the refresh threshold). Priming operations may also include executing one window's worth of instructions from application 54 with prefetch unit 28 disabled, to obtain a baseline metric in current-cycles counter 36. In particular, that value will indicate how many cycles were needed to execute one window's worth of instructions when prefetch unit 28 was disabled.

As shown at block 116, after dynamic tuning unit 30 has finished the priming operations, core 20A may continue to execute application 54. Also, concurrently with execution of application 54, dynamic tuning unit 30 may collect metrics, use those metrics to evaluate the performance of application 54, and adjust the settings of prefetch unit 28 based on those evaluations, as shown at blocks 118 and 120. Further details concerning the process for executing application 54, collect execution metrics, evaluating the performance of application 54 based on those metrics, and adjusting the settings of prefetch unit 28 accordingly are provided below with regard to FIG. 4.

As shown at block 130, dynamic tuning unit 30 may then determine whether application 54 has been terminated. If application 54 has been terminated, the process may end. But if application 54 has not been terminated, dynamic tuning unit 30 may determine whether refresh counter 30 has reached the refresh threshold, as shown at block 142. If the refresh threshold has not been reached, core 20A may continue to execute the application, and dynamic tuning unit 30 may continue using evaluation table 50 and usefulness FSM 42 to evaluate the performance of application 54 and to adjust prefetch unit 28, as indicated above.

However, if the refresh threshold has been reached, dynamic tuning unit 30 may reset the usefulness state for each SA in evaluation table 50 to the initial neutral state, thereby clearing the final states. Dynamic tuning unit 30 may also reset the IC Consequently, the refresh process enables dynamic tuning unit 30 to apply different final states to a given SA at different phases of execution, thereby providing for improved performance in a wide variety of circumstances.

FIG. 4 is a pseudocode description of operations for dynamically tuning the processor of FIG. 1. In particular, FIG. 4 includes pseudocode for an example embodiment of an execution stream to implement blocks 116, 118, and 120 of FIG. 2, as well as a key to define certain acronyms used in the execution stream.

As an overview, dynamic tuning unit 30 may use the process of FIG. 4 to populate evaluation table 50 with data for a window of execution that includes retirement of a predetermined number of instructions from application 54. In the illustrated embodiment, dynamic tuning unit 30 uses the tuning parameter 40 of "window size" to specify that number. Also, after the end of each window, dynamic tuning unit 30 may update the usefulness state for one or more SAs. For instance, during the window, if prefetch unit 28 was enabled for an SA, if that SA was executed a significant number of times, if the performance was significantly improved (in comparison with a window during which prefetch unit 28 was not enabled for that SA), and if the usefulness state for that SA is not already in a final state, dynamic tuning unit 30 may change the usefulness state of that SA in evaluation table 50 to a "better" state.

As indicated above, dynamic tuning unit 30 may determine whether performance for the current window was better than performance for the previous window based on the number of cycles needed to complete current window, compared to the number of cycles needed to complete the previous window. If the current window was completed in significantly fewer cycles, performance is considered to have improved.

Operations for evaluating execution of the application for a window and for updating usefulness states based on that evaluation are described in greater detail below, In particular, the process of FIG. 4 may begin with dynamic tuning unit 30 preparing to evaluate a new window by saving the value from current-cycles counter 36 to previous-cycles counter 38 and then resetting current-cycles counter 36 and retired-instruction counter 32. Dynamic tuning unit 30 may also reset the involvement counter in evaluation table 50 for each SA.

Then, as application 54 executes and retires one window's worth of instructions, dynamic tuning unit 30 may increment current-cycles counter 36 once per cycle, while also incrementing retired-instructions counter 32 when an instruction retires, and incrementing the relevant involvement counter in evaluation table 50 whenever a retired instruction resides at one of the selected addresses.

In FIG. 4, the operator "++" denotes the increment operation. Also, the operations between "Start Window" and "End Window" represent operations performed for a hypothetical execution stream.

In particular, in that hypothetical scenario, FIG. 4 illustrates that during each cycle, dynamic tuning unit 30 increments current-cycles counter 36 (CCC). Also, for $Cycle_1$, no instruction was retired, so dynamic tuning unit 30 does not increment retired-instruction counter 32. However, during "$Cycle_2$," core 20A retires an instruction from the reorder buffer. In particular, core 20A retires $SA_1$. In other words, core 20A retires the instruction residing at $SA_1$. Consequently, dynamic tuning unit 30 increments retired-instruction counter 32 (RIC) and refresh counter 31 (RC). In addition, dynamic tuning unit 30 increment the involvement counter (IC) in evaluation table 50 for $SA_1$. In other words, dynamic tuning unit 30 increments $IC_1$.

Then, during "$Cycle_3$," core 20A retires an instruction at an unselected address (UA). Consequently, dynamic tuning unit 30 increments CCC, RIC, and RC, but dynamic tuning unit 30 does not increment any involvement counters. Then, during "$Cycle_4$," no instructions are retired, so dynamic tuning unit 30 only increments CCC. Then, during "$Cycle_5$," core 20A retires $SA_1$ again. Consequently, dynamic tuning unit 30 increments the RIC, the RC, and the $IC_1$ again. Then, during "$Cycle_6$," core 20A retires $SA_2$. Consequently, dynamic tuning unit 30 increments the RIC, the RC, and (the involvement counter for the instruction at $SA_2$ (i.e, $IC_2$). During subsequent cycles, dynamic tuning unit 30 continues performing operations like those described above, as appropriate, based on which instructions are retired.

In addition, when core 20A retires an SA, dynamic tuning unit 30 may update the FS field for that SA in evaluation table 50 to reflect the current setting of prefetch unit 28. For example, dynamic tuning unit 30 may copy the value from feature settings 29 from prefetch unit 28 to the FS field for that SA.

However, dynamic tuning unit 30 ends or closes the window once the value in retired-instruction counter 32 equals the predetermined window size indicated in tuning parameters 40. In particular, in the embodiment of FIG. 4, dynamic tuning unit 30 ends the window after $Cycle_Q$. Accordingly, the subscript Q denotes the number of cycles needed to execute and retire one window's worth of instructions. Similarly, the value in current-cycles counter 36 will reflect that number of cycles. Also, the value in refresh counter 31 will have been incremented by the number of instructions that were retired in the current window (relative to its starting value at the beginning of the window). Alternatively, rather than incrementing refresh counter 31 whenever an instruction retires, dynamic tuning unit 30 may simply add the window size to refresh counter 31 at the end of each window.

Once the most recent (or "current") window closes, dynamic tuning unit 30 analyzes the data that was collected and may adjust usefulness states for SAs that were involved in that window. In particular, in the embodiment of FIG. 4, dynamic tuning unit 30 determines whether global-enable flag 34 is set, which indicates that prefetch unit 28 was enabled for the current window. However, if global-enable flag 34 is not set, the process passes to the else branch, and dynamic tuning unit 30 sets global-enable flag 34.

However, if global-enable flag 34 is set, then core 20A executed the current window with prefetch unit 28 enabled, and that window probably involved execution of instructions in intermediate usefulness state, which means those particular instructions would have been executed with prefetch unit 28 enabled. Consequently, dynamic tuning unit 30 analyzes the collected data to determine whether enablement of prefetch unit 28 resulted in significant performance improvements or degradations, and to adjust the states of SAs accordingly. To determine whether there was a significant loss or gain in performance for the current window, relative to the previous window, dynamic tuning unit 30 may subtract current-cycles counter 36 from previous-cycles counter 38 to generate a "cycle difference" 39 which indicates how many fewer cycles (or how many more cycles) were used in the current window. Dynamic tuning unit 30 may then compare cycle difference 39 with the predetermined significance threshold. If cycle difference 39 is not greater than or equal to the significance threshold, dynamic tuning unit 30 may skip additional evaluation and simply reset global-enable flag 34, to cause dynamic tuning unit 30 to disable prefetch unit 28 for the next window.

However, if the difference is significant, dynamic tuning unit 30 may then consider each SA to determine whether the usefulness state for that SA should be changed. In particular, as indicated within the For loop, for each SA, dynamic tuning unit 30 determines (a) whether the involvement counter for that SA is >=the predetermined involvement threshold and (b) whether that SA is in an intermediate (i.e., non-final) state. If the SA was not significantly involved in the current window, dynamic tuning unit 30 does not change the usefulness state for that SA in evaluation table 50. Likewise, if the SA is not in an intermediate state, dynamic tuning unit 30 does not change the usefulness state for that SA.

However, if the SA was significantly involved and the SA is in an intermediate state, dynamic tuning unit 30 adjusts the usefulness state for that SA, according to whether the performance improved or degraded. In particular, if fewer cycles were used in the current window, performance improved, so dynamic tuning unit 30 increments the usefulness state for that SA along one of the "Better" arrows in usefulness FSM 42. But if more cycles were used in the current window, performance degraded, so dynamic tuning unit 30 decrements the usefulness state for that SA along one of the "Worse" arrows in usefulness FSM 42.

For purposes of illustration, the above operations are described in the context of a For loop. However, in one embodiment, dynamic tuning unit 30 actually performs the evaluations and updates for all SAs in parallel. For instance, each row/entry in evaluation table 50 may include a valid flag (e.g., a bit), and dynamic tuning unit 50 may set the valid flag for a row in conjunction with loading an SA (i.e., the address for instruction to be evaluated for performance) into that row, as indicated above with regard to block 112 of FIG. 2. Accordingly, the SAs may be those addresses in evaluation table 50 which reside in rows that have had their valid flags set. Then, whenever a window ends, dynamic tuning unit 50 may evaluate performance impacts and update performance metrics for all valid SAs in parallel.

Once all of the SAs have been processed (or if cycle difference 39 is not greater than or equal to the significance threshold, as indicated above), dynamic tuning unit 30 may then reset global-enable flag 34, to cause dynamic tuning unit 30 to disable prefetch unit 28 for the next window. The process of FIG. 4 may then return to the beginning, with core 20A executing the next window with prefetch unit 28 disabled, and then the next window after that with prefetch unit 28 enabled, and so on.

Furthermore, when core 20A is executing application 54, even if global-enable flag 34 is set, if evaluation table 50 indicates that an SA has a final usefulness state of "Bad", core 20A will not use prefetch unit 28 for that SA. And even if global-enable flag 34 is clear, if evaluation table 50 indicates that an SA has a final usefulness state of "Good", core 20A will use prefetch unit 28 for that SA.

Thus, dynamic tuning unit 30 analyzes the performance of software during runtime and dynamically adjusts microarchitectural features such as prefetch unit 28 for improved performance. Also, as indicated above with regard to FIG. 3, in order to reach a final state, an SA must have at least two consecutive changes in the same direction. Accordingly, if enablement of prefetch unit 28 resulting in significantly improved performance for two consecutive globally-enabled windows, dynamic tuning unit 30 may change the usefulness state for an SA that was significantly involved in those globally-enabled windows from "neutral" (for example) to "likely good" and then from "likely good" to "good." (For purposes of this disclosure, the term "two consecutive globally-enabled windows" refers to two windows that were executed with the global-enable flag set, with no other windows executed between those two windows except for a window that was executed with the global-enable flag clear.) And if enablement of prefetch unit 28 resulting in significantly degraded performance for two consecutive globally-enabled windows, dynamic tuning unit 30 may change the usefulness state for a (significantly-involved) SA from "neutral" (for example) to "likely bad" and then from "likely bad" to "bad." However, depending in the circumstance, the usefulness state for an SA may bounce around two or more intermediate states.

For purposes of illustration, this disclosure has focused on an embodiment with a single microarchitectural feature that is dynamically tuned. However, in other embodiments, a processor may include multiple microarchitectural features that are dynamically tuned. For instance, a core may include two or more microarchitectural features, and each of those microarchitectural features may include its own dynamic tuning unit and its own evaluation table. Each dynamic tuning unit may include features like those described above with regard to dynamic tuning unit 30. And each evaluation table may include features like those described above with regard to evaluation table 50.

Also, as indicated above, a microarchitectural feature may support a range of settings, rather than just On and Off And the dynamic tuning unit may include the FS that was used for an SA when collecting metrics for the current window and updating the evaluation table. Consequently, the evaluation table may indicate the FS that was used for each SA. The dynamic tuning unit may then optimize performance based on those FSs. For instance, a processor may have a feature setting to select from a variety of different speeds (or sizes, or other types of settings) and the dynamic tuning unit may compare performance between windows using different speed settings (or size settings, or other types of settings). The dynamic tuning unit may then adjust the usefulness states for different SAs based on those comparisons. For instance, with regard to a microarchitectural feature with a range of settings from most conservation to most aggressive, the dynamic tuning unit may iterate over these each of those setting values from one end of the range to the other. If there exists a maximum of optimal performance at a particular setting within the range, then the dynamic tuning unit can identify that setting by progressively testing each setting or level, one by one.

Also, in another embodiment, a dynamic tuning unit may use two different significance thresholds, applying one to determine whether a performance improvement was significant and the other to determine whether a performance degradation was significant. Accordingly, such thresholds may be referred to as an "improvement significance threshold" and a "degradation significance threshold."

Also, the dynamic tuning unit may use any suitable values for variables such as the window size, the involvement threshold, the significance threshold, and the refresh threshold. For instance, in one embodiment or scenario, the dynamic tuning unit may use a window size of thousands of instructions (e.g., 8,000-32,000), a significance threshold of 10% or 12.5%, an involvement threshold of 10%-20%, and a refresh threshold of 200,000. However, smaller or larger values may be used for each of those variables in other embodiments or scenarios. Furthermore, values such as the significance threshold can be empirically tuned to adjust the sensitivity of the throttling mechanism for the particular microarchitectural feature.

As has been described, a dynamic tuning unit enables a processor to realize improved performance by dynamically adapting the settings of one or more microarchitectural feature based on current conditions. Moreover, the dynamic tuning unit may be implemented with control logic that is relatively simple and that does not require significant processing resources such as power.

In at least some scenarios, a dynamic tuning unit according to the present disclosure may enable a processor to realize significantly improved processing performance. For instance, in one simulated scenario, a processor that includes a microarchitectural feature for branch predication was used to execute a workload to test three different configurations. In the first test, the processor executed the workload with that microarchitectural feature disabled for the entire workload. In the second test, the processor executed the workload with that microarchitectural feature enabled for the entire workload. In the third test, the processor executed the workload with that microarchitectural feature dynamically enabled for some parts of the workload and disabled for other parts of the workload, as described herein. The second test showed that enabling the feature resulted in about a 5.9% performance improvement, relative to the first test. The third test showed that dynamically tuning the feature, as per the present disclosure, resulted in about an 8% performance improvement, relative to the first test. Thus, dynamic tuning improved the benefit of the microarchitectural feature by about 30%.

This improvement may be due, at least in part, to a reduction in the impact of negative outliers, which are parts of a workload which actually cause a microarchitectural feature to reduce the performance of the processor. For example, a microarchitectural feature for prefetching may, in general, reduce or hide memory latency, but for some parts of a workload, that microarchitectural feature may cause cache pollution with negative consequences that outweigh the prefetching benefits.

In one or more embodiments, many different kinds of microarchitectural features may be dynamically tuned by dynamic tuning units. Those microarchitectural features may include, without limitation, branch predication units, prefetch units, and other components within a processor. In addition or alternatively, those microarchitectural features may include configurable operating characteristics or settings of the processor, including, without limitation, settings such as the core clock speed, the size of one or more buffers or other storage constructs, etc.

Also, in the description above, current-cycles counter 36 denotes how many cycles are consumed when the microarchitectural feature is enabled, and previous-cycles counter 38 denotes how many cycles are consumed when the microarchitectural feature is disabled. More generally, for purposes of this disclosure, a counter which denotes how many cycles are consumed when a microarchitectural feature is enabled may be referred to as an "enabled-cycles counter," and a counter which denotes how many cycles are consumed when a microarchitectural feature is disabled may be referred to as a "disabled-cycles counter."

Additional Embodiments

FIGS. 5-9 are block diagrams of exemplary computer architectures. Such architectures may include processors with tuning control logic for dynamic tuning units as described herein. The same or similar elements in FIGS. 5-9 bear like reference numerals. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 5:
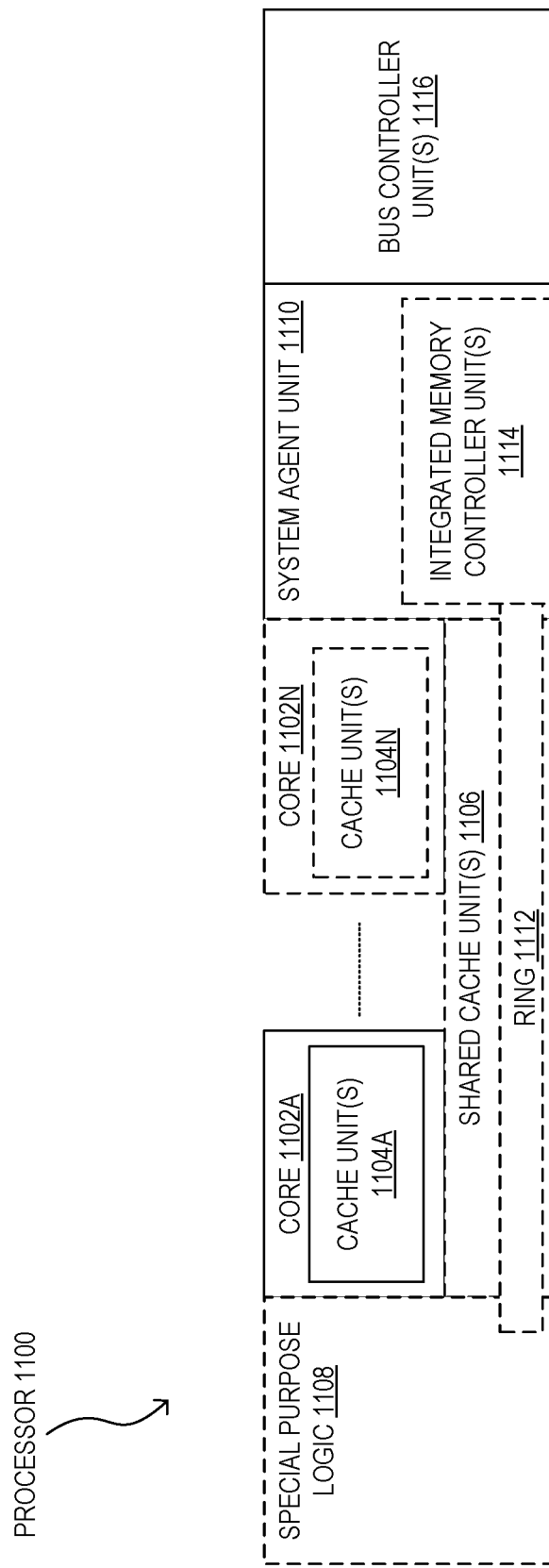
FIG. 5 is a block diagram of a processor that may have more than one core, may have an integrated memory controller, and may have integrated graphics according to one or more embodiments.

FIG. 5 is a block diagram of a processor 1100 that may have more than one core, may have an integrated memory controller, and may have integrated graphics according to one or more embodiments. The solid lined boxes in FIG. 5 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU, a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache units 1104A-N within the cores, a set or one or more shared cache units 1106, and external memory (not shown)

coupled to the set of integrated memory controller units 1114. The set of shared cache units 1106 may include one or more mid-level caches, such as L2, level 3 (L3), level 4 (L4), or other levels of cache, a last level cache (LLC), and/or combinations thereof. While in one embodiment a ring based interconnect unit 1112 interconnects the special purpose logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102 A-N.

The system agent unit 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set. Such cores 1102A-N may convert certain memory access instructions into subline memory access instructions as described herein.

Figure 6:
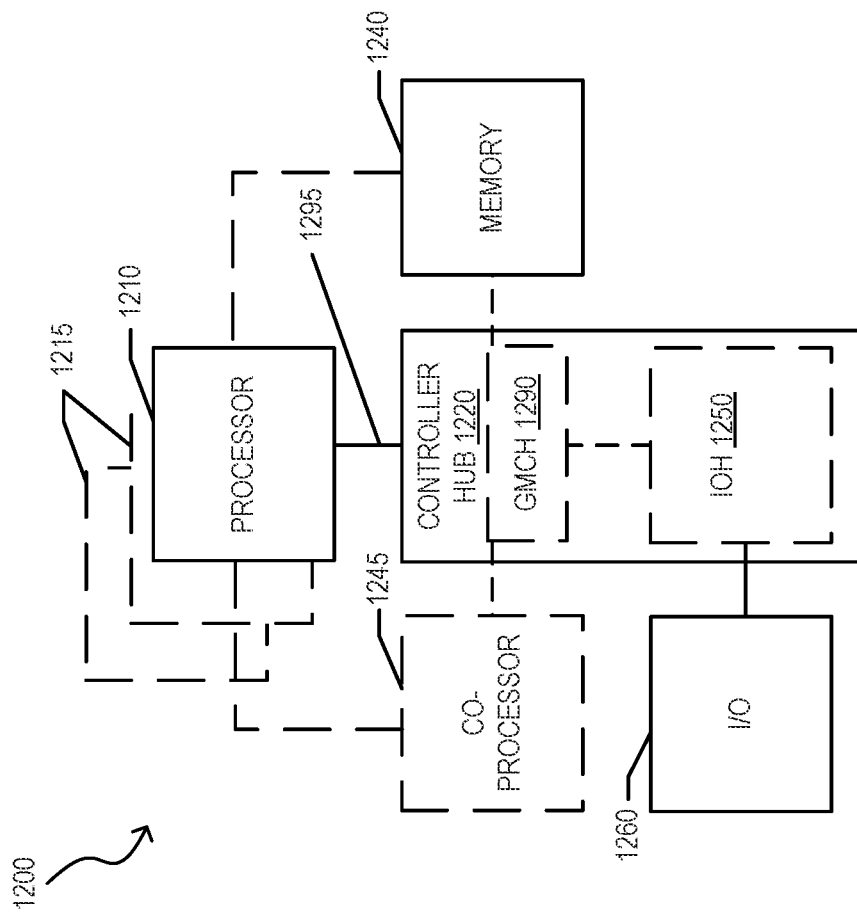
FIG. 6 is a block diagram of a system according to one or more embodiments.

FIG. 6 is a block diagram of a system 1200 according to one or more embodiments. The system 1200 may include one or more processors 1210, 1215, which are coupled to a controller hub 1220. In one embodiment, the controller hub 1220 includes a graphics memory controller hub (GMCH) 1290 and an Input/Output Hub (IOH) 1250 (which may be on separate chips); the GMCH 1290 includes a memory controller to control operations within a coupled memory and a graphics controller to which are coupled memory 1240 and a coprocessor 1245; the IOH 1250 couples input/output (I/O) devices 1260 to the GMCH 1290. Alternatively, one or both of the memory and graphics controllers are integrated within the processor, the memory 1240 and the coprocessor 1245 are coupled directly to the processor 1210, and the controller hub 1220 is in a single chip with the IOH 1250.

The optional nature of additional processors 1215 is denoted in FIG. 6 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 7:
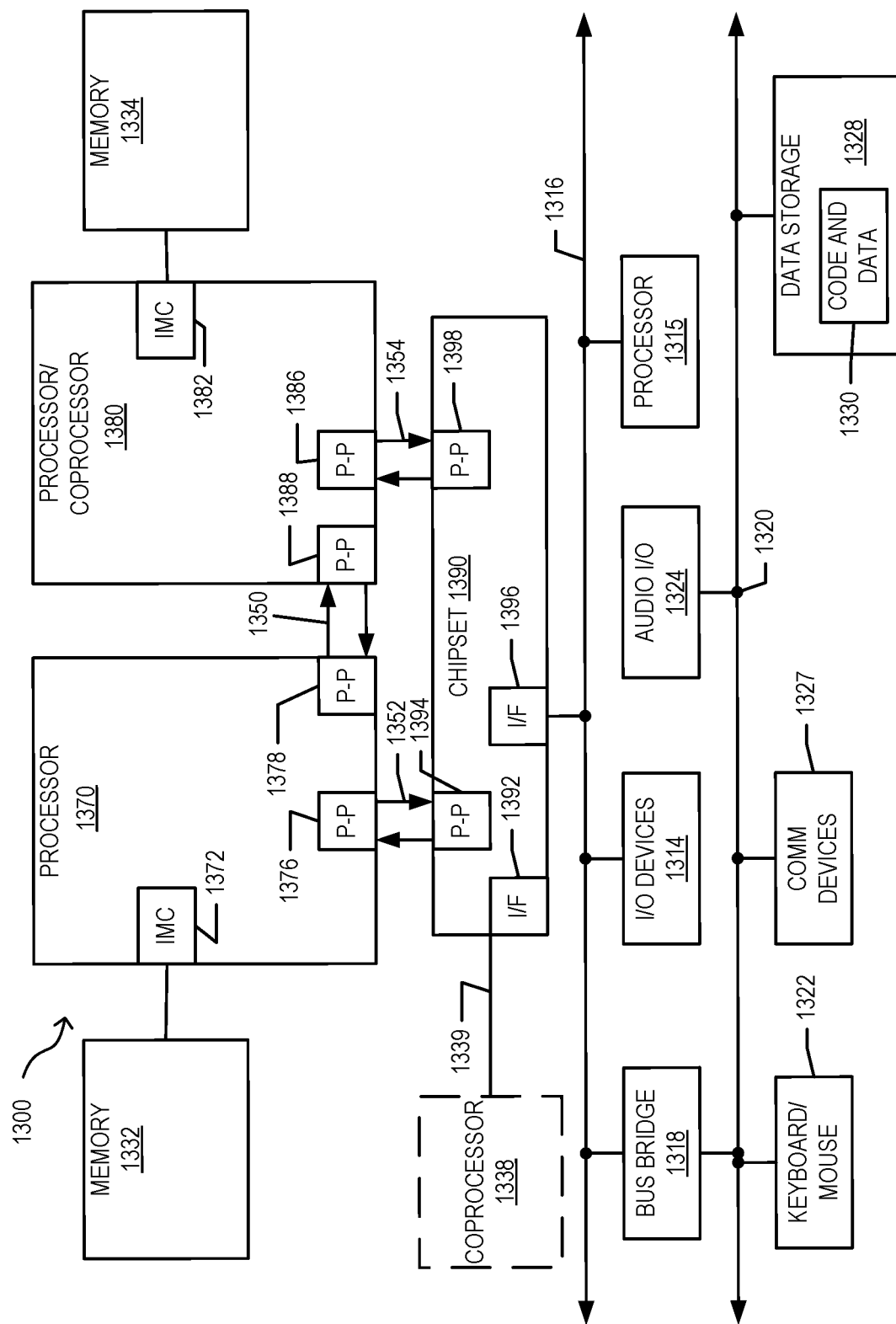
FIGS. 7 and 8 are block diagrams of more specific exemplary systems according to one or more embodiments.
Figure 8:
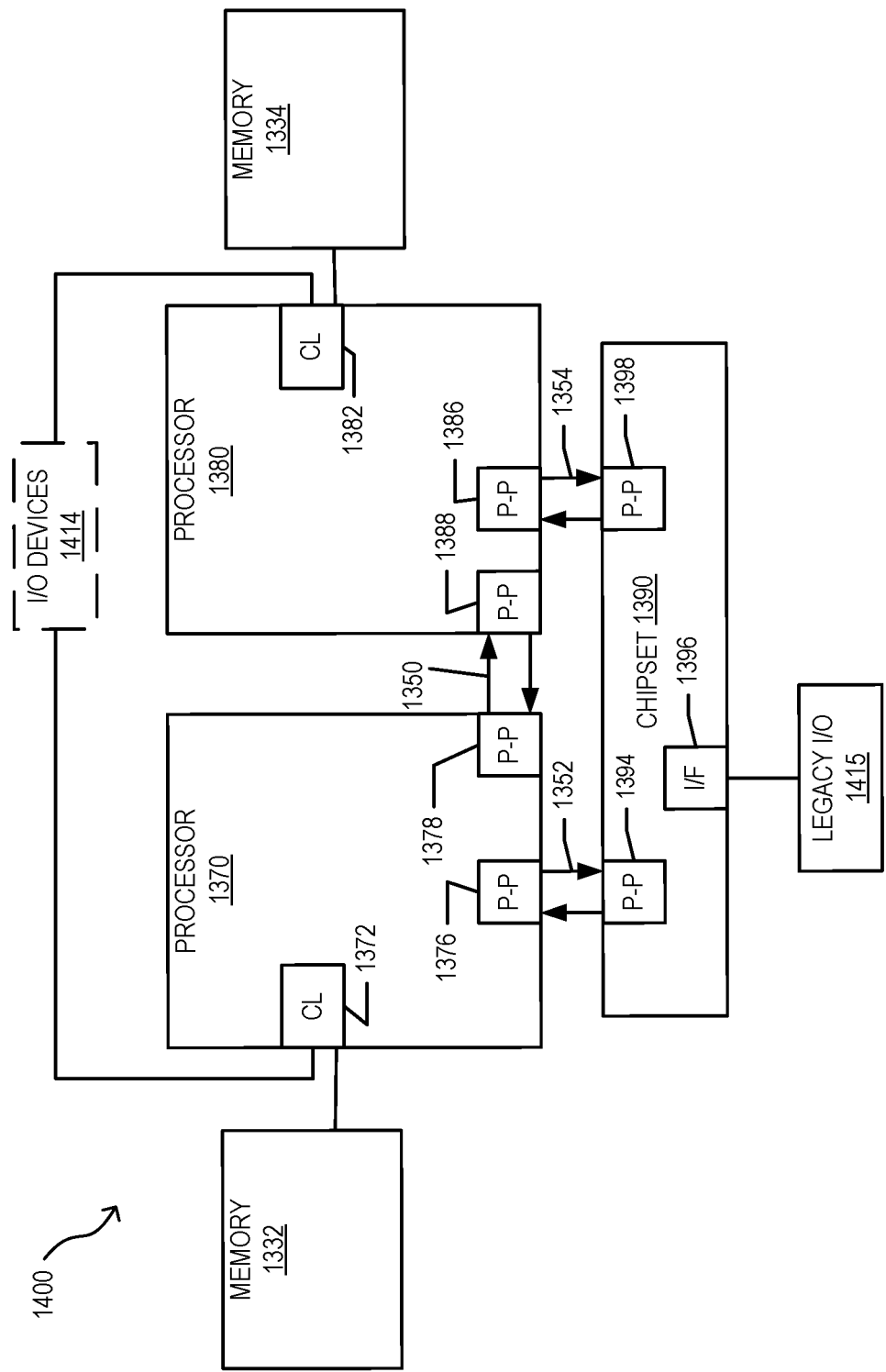

FIGS. 7 and 8 are block diagrams of more specific exemplary systems 1300 and 1400 according to one or more embodiments. As shown in FIG. 7, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment, processors 1370 and 1380 are respectively processors 1210 and 1215, while coprocessor 1338 is coprocessor 1245. In another embodiment, processors 1370 and 1380 are respectively processor 1210 and coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a P-P interface 1350 using P-P interface circuits 1378, 1388. As shown in FIG. 7, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 7, various I/O devices 1314 may be coupled to first bus 1316, along with a bus bridge 1318 which couples first bus 1316 to a second bus 1320. In one embodiment, one or more additional processors 1315, such as coprocessors, high-throughput MIC processors, GPGPUs, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 7, a system may implement a multi-drop bus or other such architecture.

FIG. 8 presents a block diagram of a second more specific exemplary system 1400 in accordance with on one or more embodiments. Certain aspects of FIG. 7 have been omitted from FIG. 8 in order to avoid obscuring other aspects of FIG. 8.

FIG. 8 illustrates that the processors 1370, 1380 may include integrated memory and I/O control logic ("CL") 1372 and 1382, respectively. Thus, the CL 1372, 1382 include integrated memory controller units and include I/O control logic. FIG. 8 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Figure 9:
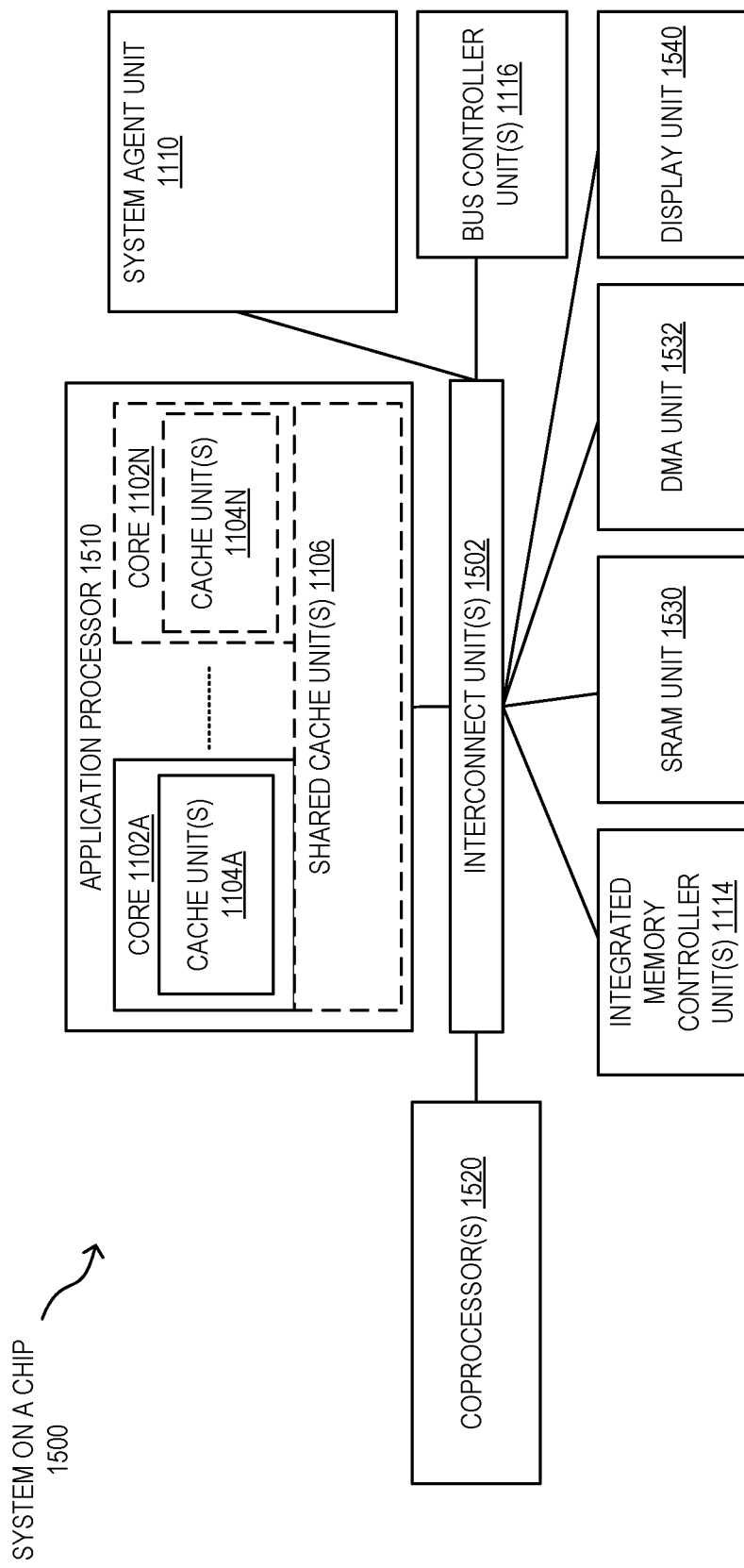
FIG. 9 is a block diagram of a system on a chip according to one or more embodiments.

FIG. 9 is a block diagram of a system on a chip (SoC) 1500 according to one or more embodiments. Dashed lined boxes are optional features on more advanced SoCs. In FIG. 9, an interconnect unit(s) 1502 is coupled to: an application processor 1510 which includes a set of one or more cores 1102A-N (including constituent cache units 1104A-N) and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Conclusion

In the present disclosure, expressions such as "an embodiment," "one embodiment," and "another embodiment" are meant to generally reference embodiment possibilities. Those expressions are not intended to limit the invention to particular embodiment configurations. As used herein, those expressions may reference the same embodiment or different embodiments, and those embodiments are combinable into other embodiments. In light of the principles and example embodiments described and illustrated herein, it will be recognized that the illustrated embodiments can be modified in arrangement and detail without departing from the principles described and/or illustrated herein.

Also, according to the present disclosure, a device may include instructions and other data which, when accessed by a processor, cause the device to perform particular operations. For purposes of this disclosure, instructions which cause a device to perform operations may be referred to in general as software. Software and the like may also be referred to as control logic. Software that is used during a boot process may be referred to as firmware. Software that is stored in nonvolatile memory may also be referred to as firmware. Software may be organized using any suitable structure or combination of structures. Accordingly, terms like program and module may be used in general to cover a broad range of software constructs, including without limitation application programs, subprograms, routines, functions, procedures, drivers, libraries, data structures, processes, microcode, and other types of software components. Also, it should be understood that a software module may include more than one component, and those components may cooperate to complete the operations of the module. Also, the operations which the software causes a device to perform may include creating an operating context, instantiating a particular data structure, etc. Embodiments may be implemented as software to execute on a programmable system comprising at least one processor, a storage system (e.g., volatile memory and/or one or more non-volatile storage elements), at least one input device, and at least one output device.

Any suitable operating environment and programming language (or combination of operating environments and programming languages) may be used to implement software components described herein. For example, program code may be implemented in a high-level procedural or object oriented programming language, or in assembly or machine language. The mechanisms described herein are not limited to any particular programming language. In any case, the language may be a compiled or interpreted language.

A medium which contains data and which allows another component to obtain that data may be referred to as a machine-accessible medium or a machine-readable medium. Accordingly, embodiments may include machine-readable media containing instructions for performing some or all of the operations described herein. Such media may be referred to in general as apparatus and in particular as program products. In one embodiment, software for multiple components is stored in one machine-readable medium. In other embodiments, two or more machine-readable media may be used to store the software for one or more components. For instance, instructions for one component may be stored in one medium, and instructions another component may be stored in another medium. Or a portion of the instructions for one component may be stored in one medium, and the rest of the instructions for that component (as well instructions for other components), may be stored in one or more other media. Similarly, software that is described above as residing on a particular device in one embodiment may, in other embodiments, reside on one or more other devices. For instance, in a distributed environment, some software may be stored locally, and some may be stored remotely. Similarly, operations that are described above as being performed on one particular device in one embodiment may, in other embodiments, be performed by one or more other devices.

Other embodiments may be implemented in data and may be stored on a non-transitory storage medium, which if used by at least one machine, causes the at least one machine to fabricate at least one integrated circuit to perform one or more operations according to the present disclosure. Still further embodiments may be implemented in a computer readable storage medium including information that, when manufactured into an SoC or other processor, is to configure the SoC or other processor to perform one or more operations according to the present disclosure. One or more aspects of at least one embodiment may be implemented by representative instructions, stored on a machine-readable medium, which represent various logic units within the processor, and which, when read by a machine, cause the machine to fabricate logic units to perform the techniques described herein. The instructions representing various logic units may be referred to as "IP cores," and they may be stored on a tangible, machine readable medium and supplied to various customers or manufacturing facilities to load into the fabrication machines that actually make the logic units or the processor. One or more aspects of at least one embodiment may include machine-readable media containing instructions or design data which defines structures, circuits, apparatuses, processors and/or system features described herein. For instance, design data may be formatted in a hardware description language (HDL).

The machine-readable media for some embodiments may include, without limitation, tangible non-transitory storage components such as magnetic disks, optical disks, magneto-optical disks, dynamic random access memory (RAM), static RAM, read-only memory (ROM), solid state drives (SSDs), phase change memory (PCM), etc., as well as processors, controllers, and other components that include data storage facilities. For purposes of this disclosure, the term "ROM" may be used in general to refer to nonvolatile memory devices such as erasable programmable ROM (EPROM), electrically erasable programmable ROM (EEPROM), flash ROM, flash memory, etc.

It should also be understood that the hardware and software components depicted herein represent functional elements that are reasonably self-contained so that each can be designed, constructed, or updated substantially independently of the others. In alternative embodiments, components may be implemented as hardware, software, or combinations of hardware and software for providing the functionality described and illustrated herein. For instance, in some embodiments, some or all of the control logic for implementing some or all of the described operations may be implemented in hardware logic (e.g., as microcode in an integrated circuit chip, as a programmable gate array (PGA) in a chip, as an application-specific integrated circuit (ASIC) in a chip, as any other suitable type of hardware circuitry in a chip, or as a combination of two or more different instances and/or types of hardware logic in one or more chips). Also, terms such as "circuit" and "circuitry" may be used interchangeably herein. Those terms and terms like "logic" may be used to refer to analog circuitry, digital circuitry, hardwired circuitry, programmable circuitry, processor circuitry, microcontroller circuitry, hardware logic circuitry, state machine circuitry, any other type of hardware component, or any suitable combination of hardware components.

Additionally, the present teachings may be used to advantage in many different kinds of data processing systems. Such data processing systems may include, without limitation, accelerators, systems on a chip (SOCs), wearable devices, handheld devices, smartphones, telephones, entertainment devices such as audio devices, video devices, audio/video devices (e.g., televisions and set-top boxes), vehicular processing systems, personal digital assistants (PDAs), tablet computers, laptop computers, portable computers, personal computers (PCs), workstations, servers, client-server systems, distributed computing systems, supercomputers, high-performance computing systems, computing clusters, mainframe computers, mini-computers, and other devices for processing or transmitting information. Accordingly, unless explicitly specified otherwise or required by the context, references to any particular type of data processing system (e.g., a PC) should be understood as encompassing other types of data processing systems, as well. A data processing system may also be referred to as an apparatus. The components of a data processing system may also be referred to as apparatus.

Also, unless expressly specified otherwise, components that are described as being coupled to each other, in communication with each other, responsive to each other, or the like need not be in continuous communication with each other and need not be directly coupled to each other. Likewise, when one component is described as receiving data from or sending data to another component, that data may be sent or received through one or more intermediate components, unless expressly specified otherwise. In addition, some components of the data processing system may be implemented as adapter cards with interfaces (e.g., a connector) for communicating with a bus. Alternatively, devices or components may be implemented as embedded controllers, using components such as programmable or non-programmable logic devices or arrays, ASICs, embedded computers, smart cards, and the like. For purposes of this disclosure, the term "bus" includes pathways that may be shared by more than two devices, as well as point-to-point pathways. Similarly, terms such as "line," "pin," etc. should be understood as referring to a wire, a set of wires, or any other suitable conductor or set of conductors. For instance, a bus may include one or more serial links, a serial link may include one or more lanes, a lane may be composed of one or more differential signaling pairs, and the changing characteristics of the electricity that those conductors are carrying may be referred to as signals on a line. Also, for purpose of this disclosure, the term "processor" denotes a hardware component that is capable of executing software. For instance, a processor may be implemented as a central processing unit (CPU), a processing core, or as any other suitable type of processing element. A CPU may include one or more processing cores, and a device may include one or more CPUs.

Also, although one or more example processes have been described with regard to particular operations performed in a particular sequence, numerous modifications could be applied to those processes to derive numerous alternative embodiments of the present invention. For example, alternative embodiments may include processes that use fewer than all of the disclosed operations, process that use additional operations, and processes in which the individual operations disclosed herein are combined, subdivided, rearranged, or otherwise altered.

Similarly, components which have been described as residing within other components in an example embodiment may be arranged differently in alternative embodiments. For instance, at least some of the components described above as residing in a dynamic tuning unit may not reside in a dynamic tuning unit in alternative embodiments.

Embodiments include the following examples:

Example A1 is a processor comprising a microarchitectural feature, DTU circuitry, and a disabled-cycles counter in the DTU circuitry. The disabled-cycles counter is to indicate how many cycles were consumed while the processor was executing a program for a first execution window with the microarchitectural feature disabled. The DTU circuitry further comprises an enabled-cycles counter to indicate how many cycles were consumed while the processor was executing a program for a second execution window with the microarchitectural feature enabled. The DTU circuitry further comprises PEU circuitry to automatically determine whether the processor achieved worse performance in the second execution window, relative to the first execution window, based on the disabled-cycles counter and the enabled-cycles counter. The processor further comprises an evaluation table that comprises a usefulness state for a selected address, (a) the usefulness state to be updated by the PEU circuitry to denote worse performance, in response to a determination that the processor achieved worse performance in the second execution window with the microarchitectural feature enabled, relative to the first execution window with the microarchitectural feature disabled, and (b) the usefulness state to be updated by the PEU circuitry to denote a confirmed bad state, in response to multiple consecutive determinations that the processor achieved worse performance with the microarchitectural feature enabled, after iteration of at least two execution windows with the microarchitectural feature enabled. The DTU circuitry further comprises TIU circuitry to automatically disable the microarchitectural feature for the selected address for subsequent execution windows, in response to the usefulness state for the selected address in the evaluation table denoting the confirmed bad state.

Example A2 is a processor according to Example A1, wherein at least some of the DTU circuitry resides in the microarchitectural feature.

Example A3 is a processor according to Example A1, wherein the usefulness state for the selected address is to be updated by the PEU circuitry to denote better performance, in response to a determination that the processor achieved better performance in the second execution window with the microarchitectural feature enabled, relative to the first execution window with the microarchitectural feature disabled. Also, after iteration of at least two execution windows with the microarchitectural feature enabled, the usefulness state for the selected address is to be updated by the PEU circuitry to denote a confirmed good state, in response to multiple consecutive determinations that the processor achieved better performance with the microarchitectural feature enabled. Also, the TIU circuitry is to automatically enable the microarchitectural feature for the selected address for subsequent execution windows, in response to the usefulness state for the selected address in the evaluation table denoting the confirmed good state. Example A3 may also include the features of Example A2.

Example A4 is a processor according to Example A1, wherein the DTU circuitry comprises an FSM to control updates to the usefulness state for the selected address, wherein the FSM provides for the confirmed bad state, a confirmed good state, and least three unconfirmed states. The unconfirmed states comprise a neutral state, a likely-good state, and a likely-bad state. Also, the usefulness state for the selected address is to start at the neutral state, and the usefulness state for the selected address is to reach the confirmed bad state in response to consecutive updates to the usefulness state (a) from the neutral state to the likely-bad state and (b) from the likely-bad state to the confirmed bad state. Example A4 may also include the features of any one or more of Examples A2-A3.

Example A5 is a processor according to Example A1, wherein each execution window comprises a predetermined number of retired instructions. Example A5 may also include the features of any one or more of Examples A2-A4.

Example A6 is a processor according to Example A1, wherein the DTU circuitry comprises a predetermined significance threshold which the PEU circuitry uses to determine whether the processor achieved significantly worse performance in the second execution window with the microarchitectural feature enabled, relative to the first execution window with the microarchitectural feature disabled. Example A6 may also include the features of any one or more of Examples A2-A5.

Example A7 is a processor according to Example A1, wherein the DTU circuitry comprises a predetermined involvement threshold that the PEU circuitry uses to determine whether an instruction at the selected address was executed at least a threshold number of times during the second execution window. Also, the PEU circuitry is to update the usefulness state for the selected address to denote worse performance with the microarchitectural feature enabled only if the selected address was executed at least the threshold number of times during the second execution window. Example A7 may also include the features of any one or more of Examples A2-A6.

Example A8 is a processor according to Example A7, wherein the evaluation table comprises an involvement counter for the selected address that is incremented in response to execution of the instruction at the selected address. Also, the PEU circuitry is to use the involvement counter and the predetermined involvement threshold to determine whether the instruction at the selected address was executed at least the threshold number of times during the second execution window.

Example B1 is a data processing system comprising RAM, a processor coupled to the RAM, a microarchitectural feature in the processor, DTU circuitry in the processor, and a disabled-cycles counter in the DTU circuitry. The disabled-cycles counter is to indicate how many cycles were consumed while the processor was executing a program for a first execution window with the microarchitectural feature disabled. The DTU circuitry also comprises an enabled-cycles counter to indicate how many cycles were consumed while the processor was executing a program for a second execution window with the microarchitectural feature enabled. The DTU circuitry further comprises PEU circuitry to automatically determine whether the processor achieved worse performance in the second execution window, relative to the first execution window, based on the disabled-cycles counter and the enabled-cycles counter. The processor further comprises an evaluation table that comprises a usefulness state for a selected address. The usefulness state is to be updated by the PEU circuitry to denote worse performance, in response to a determination that the processor achieved worse performance in the second execution window with the microarchitectural feature enabled, relative to the first execution window with the microarchitectural feature disabled, and the usefulness state is to be updated by the PEU circuitry to denote a confirmed bad state, in response to multiple consecutive determinations that the processor achieved worse performance with the microarchitectural feature enabled, after iteration of at least two execution windows with the microarchitectural feature enabled. The DTU circuitry further comprises TIU circuitry to automatically disable the microarchitectural feature for the selected address for subsequent execution windows, in response to the usefulness state for the selected address in the evaluation table denoting the confirmed bad state.

Example B2 is a data processing system according to Example B1, wherein at least some of the DTU circuitry resides in the microarchitectural feature.

Example B3 is a data processing system according to Example B1, wherein the usefulness state for the selected address is to be updated by the PEU circuitry to denote better performance, in response to a determination that the processor achieved better performance in the second execution window with the microarchitectural feature enabled, relative to the first execution window with the microarchitectural feature disabled. Also, after iteration of at least two execution windows with the microarchitectural feature enabled, the usefulness state for the selected address is to be updated by the PEU circuitry to denote a confirmed good state, in response to multiple consecutive determinations that the processor achieved better performance with the microarchitectural feature enabled. Also, the TIU circuitry is to automatically enable the microarchitectural feature for the selected address for subsequent execution windows, in response to the usefulness state for the selected address in the evaluation table denoting the confirmed good state. Example B3 may also include the features of Example B2.

Example B4 is a data processing system according to Example B1, wherein the DTU circuitry comprises an FSM to control updates to the usefulness state for the selected address, wherein the FSM provides for the confirmed bad state, a confirmed good state, and least three unconfirmed states. The unconfirmed states comprise a neutral state, a likely-good state, and a likely-bad state. The usefulness state for the selected address is to start at the neutral state, and the usefulness state for the selected address is to reach the confirmed bad state in response to consecutive updates to the usefulness state (a) from the neutral state to the likely-bad state and (b) from the likely-bad state to the confirmed bad state. Example B4 may also include the features of any one or more of Examples B2-B3.

Example B5 is a data processing system according to Example B1, wherein each execution window comprises a predetermined number of retired instructions. Example B5 may also include the features of any one or more of Examples B2-B4.

Example B6 is a data processing system according to Example B1, wherein the DTU circuitry comprises a predetermined significance threshold which the PEU circuitry uses to determine whether the processor achieved significantly worse performance in the second execution window with the microarchitectural feature enabled, relative to the first execution window with the microarchitectural feature disabled. Example B6 may also include the features of any one or more of Examples B2-B5.

Example B7 is a data processing system according to Example B1, wherein the DTU circuitry comprises a predetermined involvement threshold that the PEU circuitry uses to determine whether an instruction at the selected address was executed at least a threshold number of times during the second execution window, the PEU circuitry to update the usefulness state for the selected address to denote worse performance with the microarchitectural feature enabled only if the selected address was executed at least the threshold number of times during the second execution window. Example B7 may also include the features of any one or more of Examples B2-B6.

Example B8 is a data processing system according to Example B7, wherein the evaluation table comprises an involvement counter for the selected address that is incremented in response to execution of the instruction at the selected address. The PEU circuitry is to use the involvement counter and the predetermined involvement threshold to determine whether the instruction at the selected address was executed at least the threshold number of times during the second execution window.

Example C1 is a method performed on a processor comprising a microarchitectural feature and DTU circuitry. The method comprises executing a program for (a) a first execution window with the microarchitectural feature disabled and (b) for a second execution window with the microarchitectural feature enabled. The method further comprises (a) automatically determining, by the DTU circuitry, whether the processor achieved worse performance in the second execution window, relative to the first execution window; (b) in response to determining that the processor achieved worse performance in the second execution window, updating a usefulness state for a selected address of the program to denote worse performance; (c) in response to multiple consecutive determinations that the processor achieved worse performance with the microarchitectural feature enabled, automatically updating the usefulness state for the selected address to denote a confirmed bad state; and (d) in response to the usefulness state for the selected address denoting the confirmed bad state, automatically disabling the microarchitectural feature for the selected address for execution windows after the second execution window.

Example C2 is a method according to Example C1, wherein the operation of automatically determining whether the processor achieved worse performance in the second execution window, relative to the first execution window, is performed by PEU circuitry in the DTU circuitry. Also, the operation of automatically updating the usefulness state for the selected address to denote a confirmed bad state is performed by the PEU circuitry. Also, the operation of automatically disabling the microarchitectural feature for the selected address for execution windows after the second execution window is performed by TIU circuitry in the DTU circuitry.

Example C3 is a method according to Example C1, further comprising (a) in response to a determination that the processor achieved better performance in the second execution window with the microarchitectural feature enabled, relative to the first execution window with the microarchitectural feature disabled, updating the usefulness state for the selected address to denote better performance; (b) after iteration of at least two execution windows with the microarchitectural feature enabled, in response to multiple consecutive determinations that the processor achieved better performance with the microarchitectural feature enabled, updating the usefulness state for the selected address is to denote a confirmed good state; and (c) in response to the usefulness state for the selected address denoting the confirmed good state, automatically enabling the microarchitectural feature for the selected address for subsequent execution windows. Example C3 may also include the features of Example C2.

Example C4 is a method according to Example C1, further comprising (a) using a predetermined involvement threshold to automatically determine whether an instruction at the selected address was executed at least a threshold number of times during the second execution window; and (b) automatically updating the usefulness state for the selected address to denote worse performance with the microarchitectural feature enabled only if the selected address was executed at least the threshold number of times during the second execution window. Example C4 may also include the features of any one or more of Examples C2-C3.

In view of the wide variety of useful permutations that may be readily derived from the example embodiments described herein, this detailed description is intended to be illustrative only, and should not be construed as limiting the scope of coverage.

What is claimed is:

1. A processor comprising:
    a microarchitectural feature;
    dynamic tuning unit (DTU) circuitry;
    a disabled-cycles counter in the DTU circuitry, the disabled-cycles counter to indicate how many cycles were consumed while the processor was executing a program for a first execution window with the microarchitectural feature disabled;
    an enabled-cycles counter in the DTU circuitry, the enabled-cycles counter to indicate how many cycles were consumed while the processor was executing a program for a second execution window with the microarchitectural feature enabled; and performance evaluation unit (PEU) circuitry in the DTU circuitry, the PEU circuitry to automatically determine whether the processor achieved worse performance in the second execution window, relative to the first execution window, based on the disabled-cycles counter and the enabled-cycles counter; and an evaluation table in the processor, wherein the evaluation table comprises a usefulness state for a selected address, (a) the usefulness state to be updated by the PEU circuitry to denote worse performance, in response to a determination that the processor achieved worse performance in the second execution window with the microarchitectural feature enabled, relative to the first execution window with the microarchitectural feature disabled, and (b) the usefulness state to be updated by the PEU circuitry to denote a confirmed bad state, in response to multiple consecutive determinations that the processor achieved worse performance with the microarchitectural feature enabled, after iteration of at least two execution windows with the microarchitectural feature enabled; and tuning implementation unit (TIU) circuitry in the DTU circuitry to automatically disable the microarchitectural feature for the selected address for subsequent execution windows, in response to the usefulness state for the selected address in the evaluation table denoting the confirmed bad state.

2. A processor according to claim 1, wherein at least some of the DTU circuitry resides in the microarchitectural feature.

3. A processor according to claim 1, wherein:
the usefulness state for the selected address is to be updated by the PEU circuitry to denote better performance, in response to a determination that the processor achieved better performance in the second execution window with the microarchitectural feature enabled, relative to the first execution window with the microarchitectural feature disabled;
after iteration of at least two execution windows with the microarchitectural feature enabled, the usefulness state for the selected address is to be updated by the PEU circuitry to denote a confirmed good state, in response to multiple consecutive determinations that the processor achieved better performance with the microarchitectural feature enabled; and
the TIU circuitry is to automatically enable the microarchitectural feature for the selected address for subsequent execution windows, in response to the usefulness state for the selected address in the evaluation table denoting the confirmed good state.

4. A processor according to claim 1, wherein:
the DTU circuitry comprises a finite state machine (FSM) to control updates to the usefulness state for the selected address, wherein the FSM provides for the confirmed bad state, a confirmed good state, and least three unconfirmed states;
the unconfirmed states comprise a neutral state, a likely-good state, and a likely-bad state; and
the usefulness state for the selected address is to start at the neutral state; and
the usefulness state for the selected address is to reach the confirmed bad state in response to consecutive updates to the usefulness state (a) from the neutral state to the likely-bad state and (b) from the likely-bad state to the confirmed bad state.

5. A processor according to claim 1, wherein each execution window comprises a predetermined number of retired instructions.

6. A processor according to claim 1, wherein the DTU circuitry comprises a predetermined significance threshold which the PEU circuitry uses to determine whether the processor achieved significantly worse performance in the second execution window with the microarchitectural feature enabled, relative to the first execution window with the microarchitectural feature disabled.

7. A processor according to claim 1, wherein the DTU circuitry comprises a predetermined involvement threshold that the PEU circuitry uses to determine whether an instruction at the selected address was executed at least a threshold number of times during the second execution window, the PEU circuitry to update the usefulness state for the selected address to denote worse performance with the microarchitectural feature enabled only if the selected address was executed at least the threshold number of times during the second execution window.

8. A processor according to claim 7, wherein the evaluation table comprises an involvement counter for the selected address that is incremented in response to execution of the instruction at the selected address, the PEU circuitry to use the involvement counter and the predetermined involvement threshold to determine whether the instruction at the selected address was executed at least the threshold number of times during the second execution window.

9. A data processing system comprising:
random access memory (RAM);
a processor coupled to the RAM;
a microarchitectural feature in the processor;
dynamic tuning unit (DTU) circuitry in the processor;
a disabled-cycles counter in the DTU circuitry, the disabled-cycles counter to indicate how many cycles were consumed while the processor was executing a program for a first execution window with the microarchitectural feature disabled;
an enabled-cycles counter in the DTU circuitry, the enabled-cycles counter to indicate how many cycles were consumed while the processor was executing a program for a second execution window with the microarchitectural feature enabled; and
performance evaluation unit (PEU) circuitry in the DTU circuitry, the PEU circuitry to automatically determine whether the processor achieved worse performance in the second execution window, relative to the first execution window, based on the disabled-cycles counter and the enabled-cycles counter;
an evaluation table in the processor, wherein the evaluation table comprises a usefulness state for a selected address, (a) the usefulness state to be updated by the PEU circuitry to denote worse performance, in response to a determination that the processor achieved worse performance in the second execution window with the microarchitectural feature enabled, relative to the first execution window with the microarchitectural feature disabled, and (b) the usefulness state to be updated by the PEU circuitry to denote a confirmed bad state, in response to multiple consecutive determinations that the processor achieved worse performance with the microarchitectural feature enabled, after iteration of at least two execution windows with the microarchitectural feature enabled; and
tuning implementation unit (TIU) circuitry in the DTU circuitry to automatically disable the microarchitectural feature for the selected address for subsequent execution windows, in response to the usefulness state for the selected address in the evaluation table denoting the confirmed bad state.

10. A data processing system according to claim 9, wherein at least some of the DTU circuitry resides in the microarchitectural feature.

11. A data processing system according to claim 9, wherein:
the usefulness state for the selected address is to be updated by the PEU circuitry to denote better performance, in response to a determination that the processor achieved better performance in the second execution window with the microarchitectural feature enabled, relative to the first execution window with the microarchitectural feature disabled;
after iteration of at least two execution windows with the microarchitectural feature enabled, the usefulness state for the selected address is to be updated by the PEU circuitry to denote a confirmed good state, in response to multiple consecutive determinations that the processor achieved better performance with the microarchitectural feature enabled; and
the TIU circuitry is to automatically enable the microarchitectural feature for the selected address for subsequent execution windows, in response to the usefulness state for the selected address in the evaluation table denoting the confirmed good state.

12. A data processing system according to claim 9, wherein:
the DTU circuitry comprises a finite state machine (FSM) to control updates to the usefulness state for the selected address, wherein the FSM provides for the confirmed bad state, a confirmed good state, and least three unconfirmed states;
the unconfirmed states comprise a neutral state, a likely-good state, and a likely-bad state; and
the usefulness state for the selected address is to start at the neutral state; and
the usefulness state for the selected address is to reach the confirmed bad state in response to consecutive updates to the usefulness state (a) from the neutral state to the likely-bad state and (b) from the likely-bad state to the confirmed bad state.

13. A data processing system according to claim 9, wherein each execution window comprises a predetermined number of retired instructions.

14. A data processing system according to claim 9, wherein the DTU circuitry comprises a predetermined significance threshold which the PEU circuitry uses to determine whether the processor achieved significantly worse performance in the second execution window with the microarchitectural feature enabled, relative to the first execution window with the microarchitectural feature disabled.

15. A data processing system according to claim 9, wherein the DTU circuitry comprises a predetermined involvement threshold that the PEU circuitry uses to determine whether an instruction at the selected address was executed at least a threshold number of times during the second execution window, the PEU circuitry to update the usefulness state for the selected address to denote worse performance with the microarchitectural feature enabled only if the selected address was executed at least the threshold number of times during the second execution window.

16. A data processing system according to claim 15, wherein the evaluation table comprises an involvement counter for the selected address that is incremented in response to execution of the instruction at the selected address, the PEU circuitry to use the involvement counter and the predetermined involvement threshold to determine whether the instruction at the selected address was executed at least the threshold number of times during the second execution window.

17. A method comprising:
on a processor comprising a microarchitectural feature and dynamic tuning unit (DTU) circuitry, executing a program for (a) a first execution window with the microarchitectural feature disabled and (b) for a second execution window with the microarchitectural feature enabled;
automatically determining, by the DTU circuitry, whether the processor achieved worse performance in the second execution window, relative to the first execution window;
in response to determining that the processor achieved worse performance in the second execution window, updating a usefulness state for a selected address of the program to denote worse performance;
in response to multiple consecutive determinations that the processor achieved worse performance with the microarchitectural feature enabled, automatically updating the usefulness state for the selected address to denote a confirmed bad state; and
in response to the usefulness state for the selected address denoting the confirmed bad state, automatically disabling the microarchitectural feature for the selected address for execution windows after the second execution window.

18. A method according to claim 17, wherein:
the operation of automatically determining whether the processor achieved worse performance in the second execution window, relative to the first execution window, is performed by performance evaluation unit (PEU) circuitry in the DTU circuitry;
the operation of automatically updating the usefulness state for the selected address to denote a confirmed bad state is performed by the PEU circuitry; and
the operation of automatically disabling the microarchitectural feature for the selected address for execution windows after the second execution window is performed by tuning implementation unit (TIU) circuitry the DTU circuitry.

19. A method according to claim 17, further comprising:
in response to a determination that the processor achieved better performance in the second execution window with the microarchitectural feature enabled, relative to the first execution window with the microarchitectural feature disabled, updating the usefulness state for the selected address to denote better performance;
after iteration of at least two execution windows with the microarchitectural feature enabled, in response to multiple consecutive determinations that the processor achieved better performance with the microarchitectural feature enabled, updating the usefulness state for the selected address is to denote a confirmed good state; and
in response to the usefulness state for the selected address denoting the confirmed good state, automatically enabling the microarchitectural feature for the selected address for subsequent execution windows.

20. A method according to claim 17, further comprising:
using a predetermined involvement threshold to automatically determine whether an instruction at the selected address was executed at least a threshold number of times during the second execution window; and automatically updating the usefulness state for the selected address to denote worse performance with the microarchitectural feature enabled only if the selected address was executed at least the threshold number of times during the second execution window.

\* \* \* \* \*